US009639728B1

United States Patent
Handshaw et al.

(10) Patent No.: US 9,639,728 B1
(45) Date of Patent: May 2, 2017

(54) IMAGING MODULE AND READER FOR, AND METHOD OF, READING A TARGET OVER A FIELD OF VIEW BY IMAGE CAPTURE WITH A VISUALLY PROMINENT INDICATOR OF A CENTER ZONE OF THE FIELD OF VIEW

(71) Applicant: SYMBOL TECHNOLOGIES, LLC, Lincolnshire, IL (US)

(72) Inventors: Darran Michael Handshaw, Sound Beach, NY (US); Igor Vinogradov, Oakdale, NY (US); Vladimir Gurevich, Great Neck, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/248,181

(22) Filed: Aug. 26, 2016

(51) Int. Cl.
*G06K 7/10* (2006.01)

(52) U.S. Cl.
CPC ..... *G06K 7/10732* (2013.01); *G06K 7/10831* (2013.01); *G06K 7/10881* (2013.01)

(58) Field of Classification Search
CPC ........... G06K 7/10722; G06K 7/10732; G06K 7/10742; G06K 7/10831
USPC .................. 235/454, 462.21, 472.01–472.03
See application file for complete search history.

(56) References Cited

U.S. PATENT DOCUMENTS

| 7,140,543 | B2 * | 11/2006 | Giordano | G06K 7/10594 235/454 |
| 8,113,430 | B2 | 2/2012 | Oliva et al. | |
| 8,657,199 | B2 * | 2/2014 | Barkan | G06K 7/10722 235/462.11 |
| 9,292,724 | B1 * | 3/2016 | Flugge | G06K 7/10831 |
| 2014/0089121 | A1 * | 3/2014 | Kaminsky | G07G 1/0081 705/23 |
| 2015/0363619 | A1 * | 12/2015 | Lei | G06K 7/10811 235/455 |

* cited by examiner

*Primary Examiner* — Seung Lee

(57) ABSTRACT

An imaging sensor of an imaging reader senses return light from a target to be read by image capture along an imaging axis over a field of view that extends along mutually orthogonal, horizontal and vertical axes. Two aiming light assemblies are offset from the sensor, and direct an aiming light pattern at the target. The pattern has an aiming mark in a central area of the pattern, and a pair of aiming light lines that are collinear along the horizontal axis. The visibility of the aiming mark is enhanced by optically configuring the aiming mark to be different in brightness relative to a remaining area of the pattern by specially configuring aiming lenses with regions of different optical power to forte each aiming light line of non-uniform brightness. The aiming mark of enhanced visibility constitutes a prominent visual indicator of a center zone of the field of view.

20 Claims, 5 Drawing Sheets

IMAGING MODULE AND READER FOR, AND METHOD OF, READING A TARGET OVER A FIELD OF VIEW BY IMAGE CAPTURE WITH A VISUALLY PROMINENT INDICATOR OF A CENTER ZONE OF THE FIELD OF VIEW

BACKGROUND OF THE INVENTION

The present disclosure relates generally to an imaging module and an imaging reader for, and a method of, reading a target, such as a bar code symbol, to be electro-optically read by image capture over a field of view in a range of working distances away from the module/reader, and, more particularly, to using an aiming mark of an aiming light pattern to substantially center the target in the field of view, especially in a field crowded with targets, and, still more particularly, to optically enhancing the visibility of the aiming mark to serve as a more prominent visual indicator of a center zone of the field of view.

Solid-state imaging systems or imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module that is mounted in a housing, and that has an aiming light system for projecting a visible aiming light pattern along an aiming axis to visually locate a target within a field of view and, thus, advise an operator which way the reader is to be moved in order to position the aiming light pattern on the target, typically at a center thereof, prior to reading; an illumination system for emitting illumination light toward the target for reflection and scattering therefrom; and an imaging system having a solid-state imager with a sensor array of photocells or light sensors, and an optical assembly for capturing return illumination light scattered and/or reflected from the target being imaged over the field of view centered on an imaging axis, and for projecting the captured illumination light onto the imager to initiate capture of an image of the target. The imager produces electrical signals that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

The aiming light system is typically physically offset horizontally and/or vertically away from the imaging system. This horizontal/vertical offset or parallax positions the aiming light pattern to be off-center relative to the imaging axis, and is especially undesirable when targets in the near range close to the reader are to be read, because the operator would be erroneously guided to position the reader such that a part of the target would typically lie outside the field of view, and therefore, the target will often not be centered and read.

It is known to configure the aiming light system in the imaging reader with a laser, a focusing lens, and a pattern shaping optical element, such as a diffractive optical element (DOE), or a refractive optical element (ROE) to project the aiming light pattern as, for example, a pair of crosshairs for placement at the center of the target, or as continuous lines or rows of light spots, for placement on the target to approximately indicate the field of view. Yet, the lasers and the optical components of such laser-based aiming systems are relatively expensive to fabricate and be optically aligned when mounted in the reader, thereby making them unsuitable for low cost, imaging readers. It is also known to configure the aiming light system in the imaging reader with one or more light emitting diodes (LEDs) to project the aiming light pattern as, for example, one or more generally circular spots, or as a single aiming line, for placement on the target. Such aiming light patterns generally indicate approximately where the center of the field of view is, or indicate approximately where the outer boundaries or end limits of the field of view are, but not both simultaneously. In any event, such laser-based and LED-based aiming systems are subject to the same aforementioned horizontal offset positioning error when the imaging and aiming light systems are offset from each other.

It is also known to project onto the target an aiming light pattern having a pair of aiming light lines, each with a predetermined uniform brightness, and having linear end portions that partially overlap each other to form an aiming mark having a brightness greater than the predetermined uniform brightness to visually indicate the approximate center zone of the field of view over the range of working distances. Although generally satisfactory for its intended purpose, experience has shown that the aiming mark is not always clear and discernible in all cases, and is not always very visible or sufficiently bright when viewed, for example, against white backgrounds, and/or in brightly lit venues, and/or when text or bar code symbols are introduced into the field of view. Failure to accurately center a target is particularly important when the field of view is crowded with targets, for example, when multiple targets are located closely adjacent one another in a picklist from which warehouse personnel must select and read only those targets corresponding to ordered items that are to be retrieved from a warehouse or like facility.

Accordingly, it would be desirable to more accurately and more prominently indicate the center of the field of view of an imaging reader over a range of working distances despite a horizontal offset between the imaging and aiming light systems of the reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
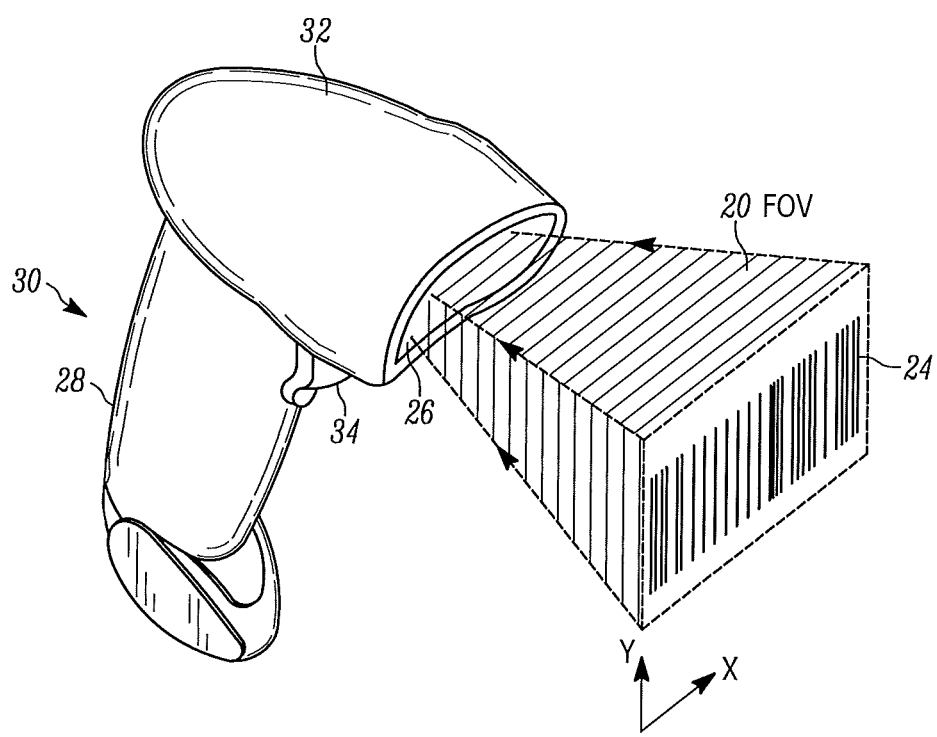
FIG. 1 is a perspective view of an exemplary embodiment of an electro-optical handheld reader for reading targets by image capture in which an imaging module is mounted in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, reader and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for reading a target, e.g., a bar code symbol, by image capture over a range of working distances away from the module. The module includes an imaging system that has an imaging sensor, e.g., a two-dimensional, solid-state, sensor, such as a charge coupled device (CCD) or a complementary metal oxide semiconductor (CMOS) array of image sensors, for sensing light returning from the target along an imaging axis over a field of view that extends along mutually orthogonal, horizontal and vertical axes that are generally perpendicular to the imaging axis. The module also includes an aiming light system that is offset from the imaging system, and directs an aiming light pattern at the target and optically forms the aiming light pattern with an aiming mark in a central area of the aiming light pattern and with a pair of aiming light lines that are collinear along the horizontal axis. The aiming light system also optically enhances the visibility of the aiming mark relative to a remaining area of the aiming light pattern by optically configuring the aiming light lines to be of non-uniform brightness and, more particularly, to have a greater brightness closer to the imaging axis and a lesser brightness further away from the imaging axis. The aiming mark of enhanced visibility constitutes a prominent visual indicator of a center zone of the field of view in which the target is positioned over the range of working distances. Thus, the target can be reliably centered in the field of view without parallax to the imaging axis, which is of particular importance when the field is crowded with targets that are closely adjacent one another, and then electro-optically read by image capture.

Advantageously, the aiming light system includes a pair of aiming light assemblies spaced apart along the horizontal axis at opposite sides of the imaging sensor. The light assemblies include a pair of aiming light sources, e.g., light emitting diodes, for emitting a pair of aiming lights along a pair of aiming axes, a pair of aiming source apertures, preferably elongated openings extending along the horizontal axis, through which the aiming lights respectively pass along the aiming axes, and a pair of aiming lenses for respectively optically modifying the aiming lights to form the aiming light pattern.

The aiming lenses are specially configured to form the aiming light lines of non-uniform brightness. In a preferred embodiment, each aiming lens has an entrance surface on which the aiming lights are incident, and an exit surface from which the aiming lights are projected onto the target. Each exit surface is a single, continuous, freeform surface that is free of discontinuities. The aiming lenses are symmetrically located at opposite sides of the imaging axis. Each aiming lens has an inner high power region of greater optical power that is closer to the imaging axis, and an outer low power region of lesser optical power that is further from the imaging axis. Each high power region merges smoothly into its respective low power region. Each aiming lens has an optical power that increases along the horizontal axis in a direction toward the imaging axis, and each aiming light line has a brightness that increases along the horizontal axis in a direction toward the imaging axis. The inner high power regions project a major portion of the aiming lights onto the aiming mark, and the outer low power regions project a minor portion of the aiming lights onto the remaining area of the aiming light pattern. Thus, the aiming mark is more visually prominent and brighter in light intensity than the remaining area of the aiming light pattern. The inner high power regions and the outer low power regions are curved, and the inner high power regions have a greater curvature than the outer low power regions.

The aiming lenses may be discrete elements, or preferably are of one-piece construction. Still more preferably, a light-transmissive window overlies the imaging sensor, and the aiming lenses are of one-piece construction with the window. The lenses and the window may be made of plastic and/or glass, but preferably, the plastic aiming lenses are molded jointly with the plastic window. Advantageously, the window is positioned in direct, sealed contact with the module to environmentally isolate the assemblies therein.

In accordance with another feature of this disclosure, the aforementioned imaging module is mounted in a housing of an imaging reader that has a light-transmissive window. The imaging sensor senses light returning from the target through the window, and the aiming light pattern is directed through the window at the target. The housing is preferably embodied as a portable, point-of-transaction, gun-shaped, handheld housing, but could be embodied as a handheld, box-shaped housing, or any other configuration including a hands-free configuration.

In accordance with yet another feature of this disclosure, a method of reading a target by image capture over a range of working distances away from an imaging reader, is performed by sensing light returning from the target along an imaging axis over a field of view that extends along mutually orthogonal, horizontal and vertical axes that are generally perpendicular to the imaging axis, by directing an aiming light pattern at the target, by optically forming the aiming light pattern with an aiming mark in a central area of the aiming light pattern and with a pair of aiming light lines that are collinear along the horizontal axis, and by enhancing the visibility of the aiming mark relative to a remaining area of the aiming light pattern by optically configuring the aiming light lines to be of non-uniform brightness. The aiming mark of enhanced visibility constitutes a prominent visual indicator of a center zone of the field of view in which the target is positioned over the range of working distances.

Figure 2:
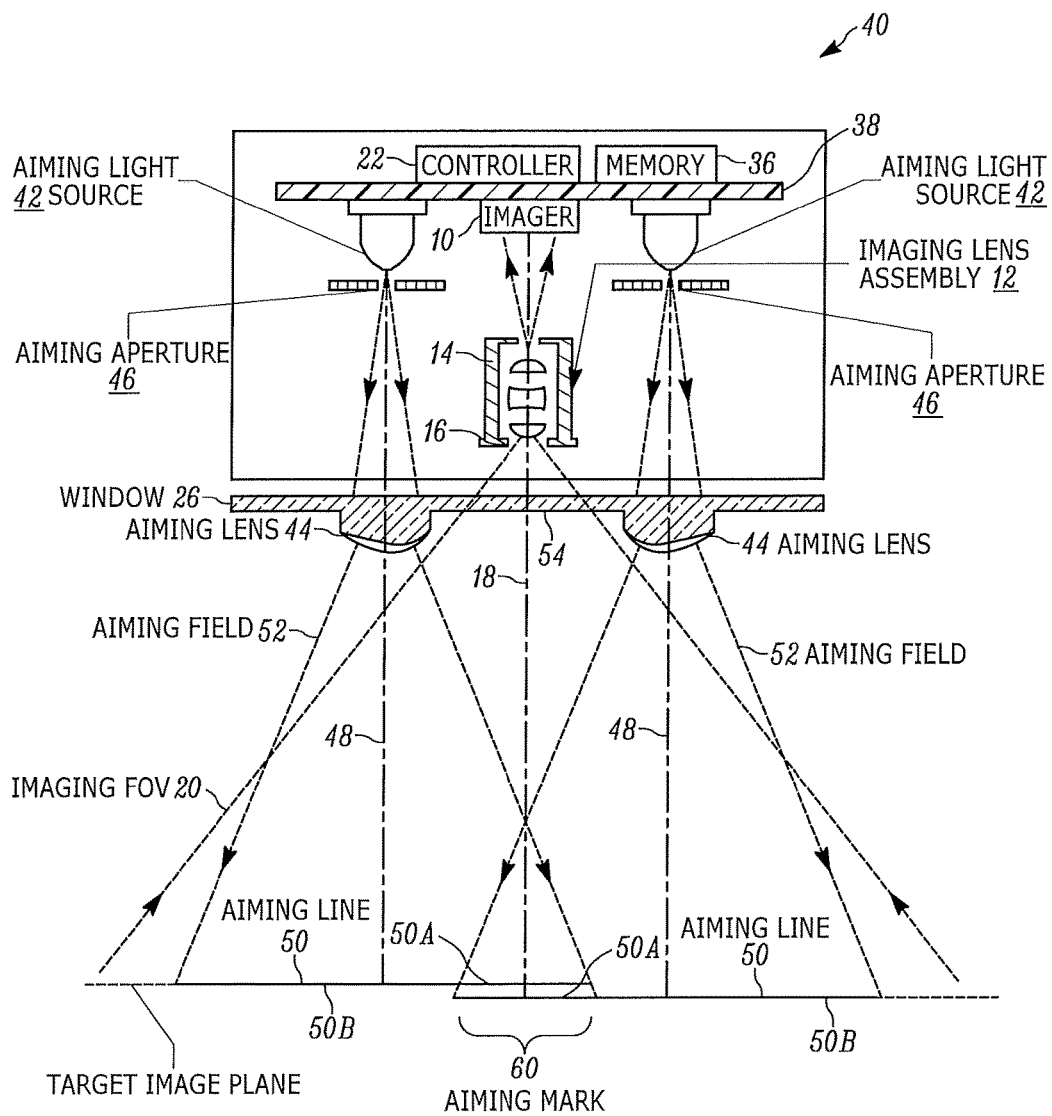
FIG. 2 is a diagrammatic view of components of imaging and aiming light systems onboard the imaging module within the reader of FIG. 1.

Turning now to the drawings, reference numeral 30 in FIG. 1 generally identifies a handheld imaging reader for electro-optically reading targets 24, such as bar code symbols or like indicia, over an angular imaging field of view (FOV) 20. The reader 30 includes a housing 32 in which an imaging or scan engine or imaging module 40, as described in detail below in connection with FIG. 2, is mounted. The housing 32 includes a generally elongated handle or lower handgrip portion 28 and a barrel or upper body portion having a front end at which a light-transmissive window 26 is located. The cross-sectional dimensions and overall size of the handle 28 are such that the reader 30 can conveniently be held in an operator's hand. The body and handle portions may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the various components and systems of this reader 30. A manually actuatable trigger 34 is mounted in a moving relationship on the handle 28 in a forward facing region of the reader 30. An operator's forefinger is used to actuate the reader 30 to initiate reading by depressing the trigger 34. Although the housing 32 has been illustrated as a portable, point-of-transaction, gun-shaped, handheld housing, this is merely exemplary, because the housing could also be embodied as a handheld, box-shaped housing, or with any other configuration including a hands-free configuration.

As diagrammatically shown in FIG. 2, the imaging module 40 includes an imaging system having a solid-state imager 10, and an imaging lens assembly 12 mounted in a tubular holder 14 that has a circular aperture 16. The imager 10 is a two-dimensional, charge coupled device (CCD) array or a complementary metal oxide semiconductor (CMOS) array of cells or sensors having either a global or a rolling shutter. For low cost reasons, a CMOS imager may be advantageously used with a rolling shutter. The imager 10 and imaging lens 12 are preferably aligned along a centerline or an optical imaging axis 18 generally centrally located within the upper body portion of the housing 32.

In operation, the imaging system captures return light passing through a central zone 54 of the window 26 along the imaging axis 18 centered in the imaging field of view 20 of the imaging lens assembly 12 from the target 24 located in a range of working distances away from the window 26. The imager 10 is advantageously positioned closer to a rear wall of the upper body portion than to a front of the housing 32 in order to enlarge the imaging field of view 20 in the near range of working distances close to the reader 30. The imaging lens assembly 12 preferably comprises one or more fixed-focus lenses, preferably a Cooke triplet, having an imaging or target image plane at which the target 24 is best focused and imaged onto the imager 10. The field of view 20 is generally rectangular and extends along the illustrated mutually orthogonal, horizontal X-axis and vertical Y-axis (see FIG. 1) that are both generally perpendicular to the imaging axis 18. The sensors produce electrical signals corresponding to a two-dimensional array of pixel information for an image of the target 24. The electrical signals are processed by a controller or programmed microprocessor 22 into data indicative of the target 24 being read. The controller 22 is connected to a memory 36 for data retrieval and storage. The controller 22 and the memory 36 may be mounted on a printed circuit board (PCB) 38, which is supported by the module 40.

The imaging system is capable of acquiring a full image of the target 24 under various lighting conditions. A non-illustrated illuminating system may also be mounted on the module 40 to provide illuminating light to illuminate the target. Exposure time is controlled by the controller 22. Resolution of the array can be of various sizes although a VGA resolution of 640×480 pixels may be used to minimize cost.

An aiming system, including one or more aiming light assemblies, is supported on the module 40, and is offset from the imaging system. The aiming system is operative for projecting on the target 24 an aiming light pattern 100 having an aiming mark 60 and a pair of aiming light lines 50 (see FIGS. 2-3). The aiming light assemblies are spaced apart along the horizontal X-axis at opposite sides of the imaging sensor 10. Each aiming light assembly includes an aiming light source or emitter, e.g., a light emitting diode (LED) 42, mounted on the PCB 38; a generally linear, aiming aperture 46 that extends along the horizontal X-axis in front of the respective LED 42; and an aiming lens 44 mounted away from its respective LED 42 and specially configured, as more fully described below. Each aiming LED 42, aiming lens 44 and aiming aperture 46 are centered and lie along a respective aiming axis 48. The aiming axes 48 generally lie in a common plane and are generally parallel to one another. The aiming LEDs 42 and the sensor 10 may be mounted along a common horizontal axis, but this need not be the case, since the aiming LEDs 42 can be mounted either above or below the imager 10. Advantageously, the imaging axis 18 lies in the same plane and is generally parallel to the aiming axes 48.

Figure 3:
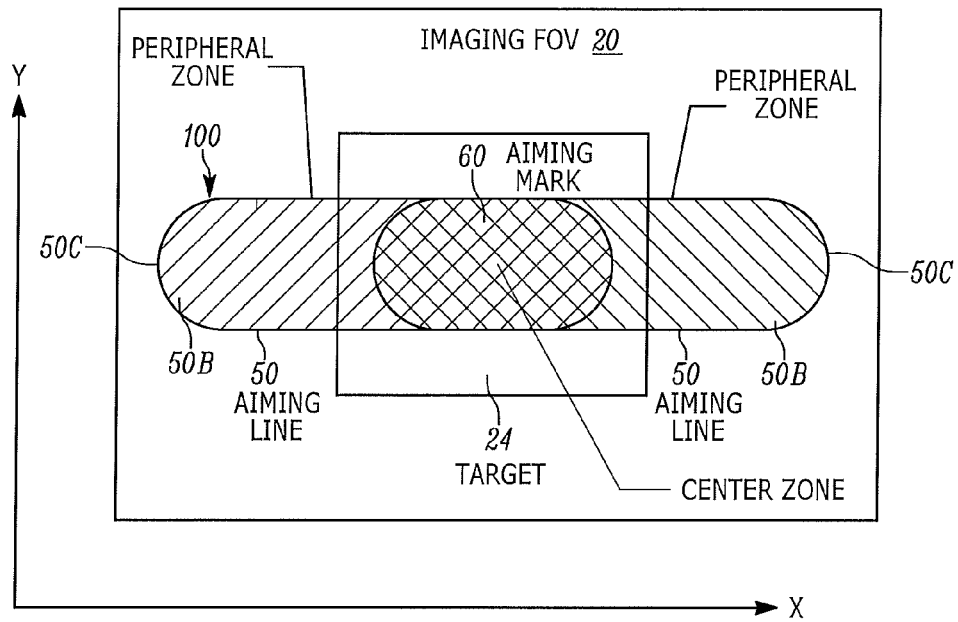
FIG. 3 is an enlarged, diagrammatic view of an aiming light pattern produced by the aiming light system of FIG. 2 in accordance with this disclosure.

The aiming light assemblies are operative for directing the aiming light emitted from each aiming LED 42 through the respective aperture 46 and the respective aiming lens 44 along the respective aiming axis 48 over an angular aiming field 52 that is centered on the respective aiming axis 48 at the target 24. On the target 24, these aiming fields 52 describe the pair of aiming light lines 50, each having a predetermined brightness. As shown in FIG. 3, the aiming light lines 50 are collinear along the horizontal X-axis. The aiming light lines 50 have inner linear end regions 50A that extend past the imaging axis 18 and that overlap on the target 24 to form the aiming mark 60 having a brightness greater than, for example, about twice, the predetermined brightness due to the superposition of the inner linear end regions 50A to visually indicate a center area of the field of view 20 over the range of working distances. Thus, the operator can position the aiming mark 60 on the target 24, and the target 24 will be substantially centered in the imaging field of view 20. The aiming light lines 50 also have outer linear end regions 50B that extend along the horizontal X-axis toward opposite end regions 50C that visually indicate, approximate boundary zones or end limits of the field of view 20 over the range of working distances. Thus, the operator is guided to position the outer linear end regions 50B on the target 24, such that the target 24 will be substantially contained entirely within the imaging field of view 20.

As best seen in FIG. 2, the aiming lenses 44 may be forming of one-piece construction with the window 26 at opposite sides of, and away from, the central zone 54 through which the image of the target 24 is captured. The window 26 may be constituted of glass and/or molded plastic materials, and the aiming lenses 44 may likewise be constituted of glass and/or molded plastic materials. Thus, the window 26 may be made of glass and each aiming lens 44 may be made of the same glass. Alternatively, the window 26 may be made of plastic and each aiming lens 44 may be made of the same plastic. In other variations, the window 26 may be made of glass and each aiming lens 44 may be made of plastic that is deposited or molded onto the glass in a process known as overmolding or replication, or vice versa, in which the window 26 may be made of plastic and each aiming lens 44 may be made of glass that is molded into the plastic. Although the aiming lenses 44 are shown on the outer surface of the window 26, they can also be formed on the inner surface of the window 26. Thus, the aiming lenses 44 are integral with the window 26, thereby reducing the total number of components to be individually fabricated, installed and aligned. Alternatively, the aiming lenses 44 may be integral with each other and constitute a single optical component that is separate from the window 26, or the aiming lenses 44 may be discrete, optical elements that are separate from each other and from the window 26.

Figure 4:
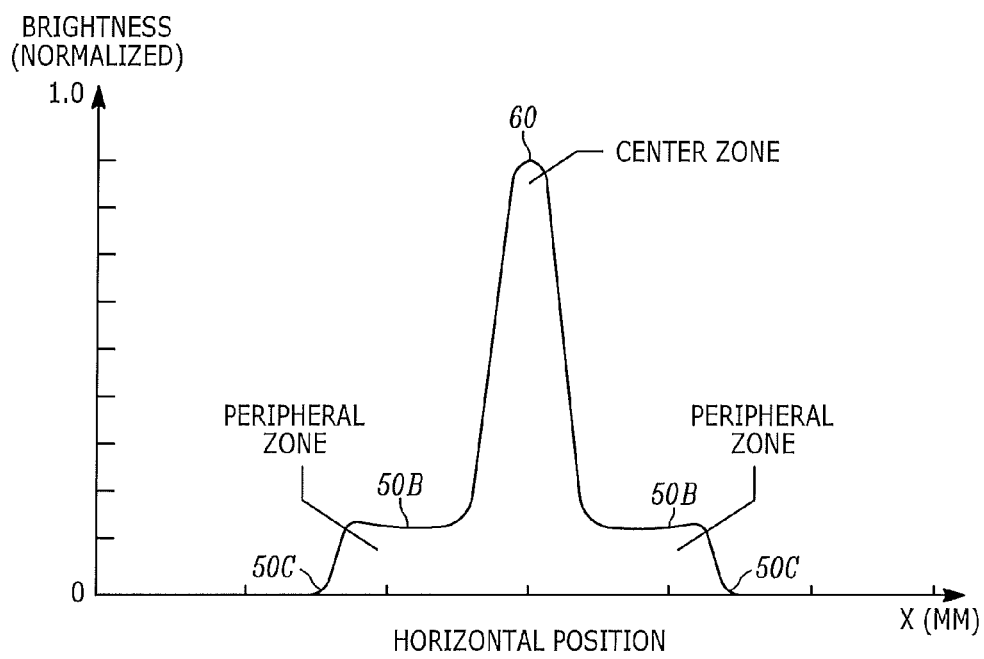
FIG. 4 is a graph depicting the brightness distribution horizontally along the aiming light pattern of FIG. 3.

As described so far, the aiming mark 60 is brighter than the remaining area of the aiming light pattern due to the superposition of the inner linear end regions 50A. Yet, as described above, the resulting aiming mark 60 is not always clear and discernible in all cases, and is not always very visible or sufficiently bright when viewed, for example, against white backgrounds, and/or in brightly lit venues, and/or when text or bar code symbols are introduced into the field of view 20. In accordance with this disclosure, the aiming light system further enhances the visibility of the aiming mark 60 to be much brighter in light intensity as, for example, depicted by the brightness distribution of the aiming light pattern of FIG. 3 along the horizontal X-axis as shown in FIG. 4, in which the brightness of the aiming mark 60 at the center zone is more than twice, for example, about six times greater in light intensity than, the brightness of the outer linear end regions 50B at the peripheral zones. This enhanced brightness is achieved by specially configuring each aiming lens 44 to form each aiming light line to be of non-uniform brightness, as described in detail below.

Figure 5:
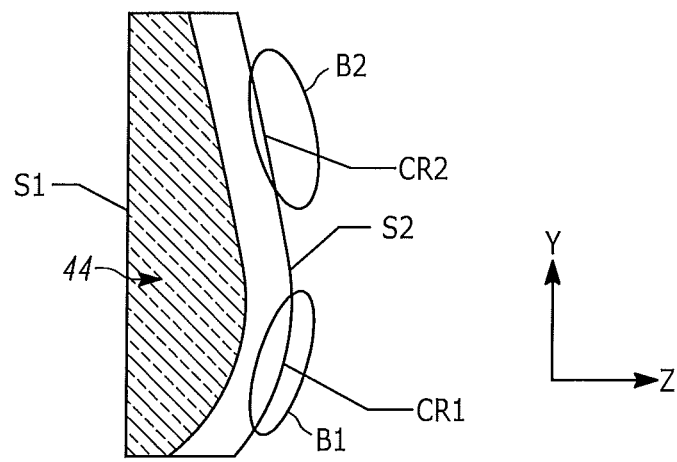
FIG. 5 is a side view of a representative aiming lens used in the aiming light system of FIG. 2.
Figure 6:
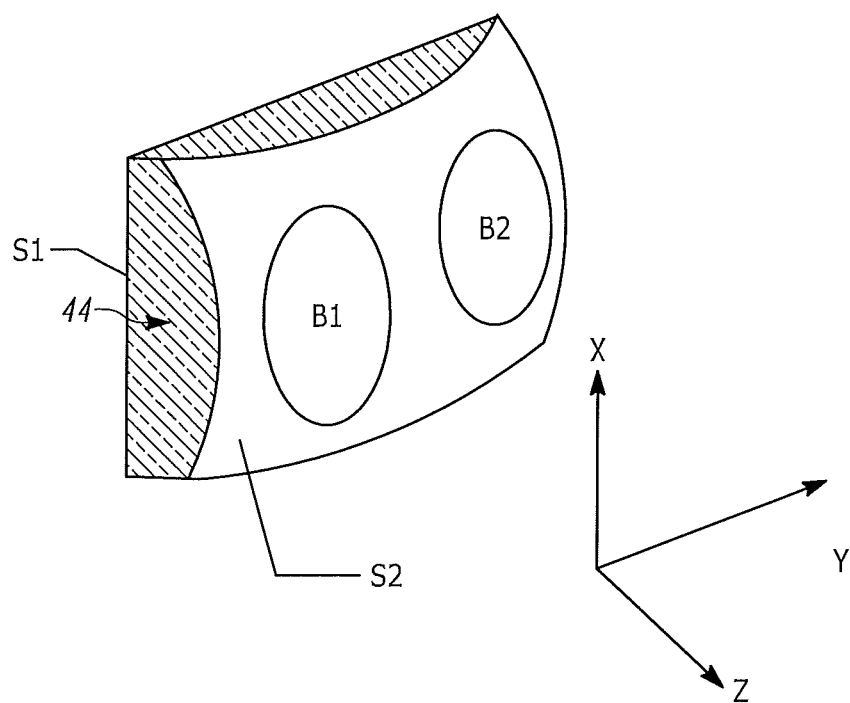
FIG. 6 is a perspective view of the representative aiming lens of FIG. 5.
Figure 7:
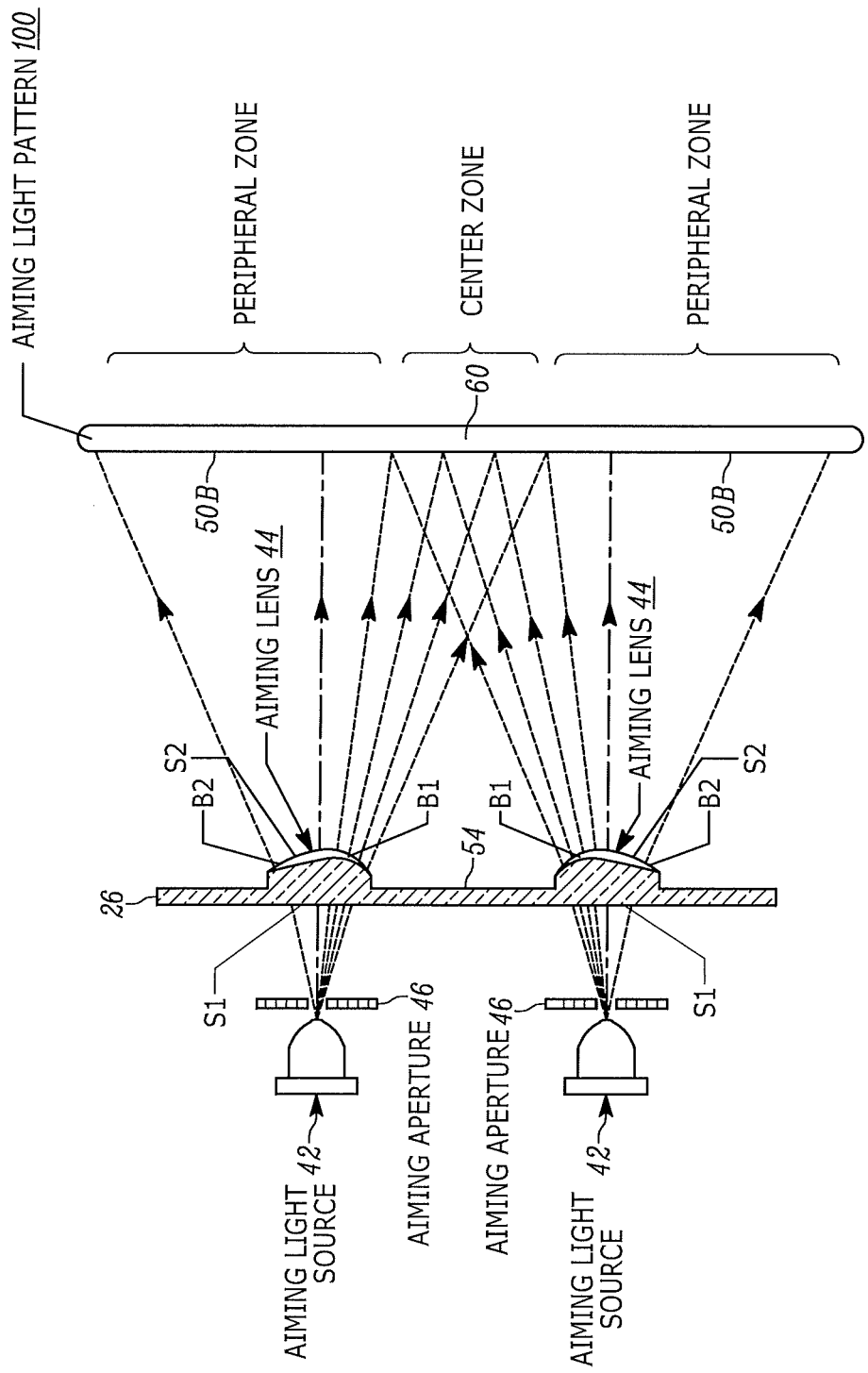
FIG. 7 is an enlarged, diagrammatic view depicting how light rays are optically modified to form the aiming light pattern of FIG. 3.

Thus, as shown in FIGS. 5-7, each aiming lens 44 has an entrance surface S1 on which the aiming lights passing through each aiming aperture 46 are incident, and an exit surface S2 from which the aiming lights are projected onto the target 24. Each entrance surface S1 is preferably generally planar as illustrated, but could be provided with some optical power. Each exit surface S2 is a single, continuous, polynomial, freeform surface that is free of discontinuities, e.g., abrupt edges or segments. As shown in FIG. 2, the aiming lenses 44 are symmetrically located at opposite sides of the imaging axis 18. Each aiming lens 44 has an inner high power region B1 of greater optical power that is closer to the imaging axis 18, and an outer low power region B2 of lesser optical power that is further from the imaging axis 18. Each inner high power region B1 has a greater curvature CR1 than the lower curvature CR2 of the respective outer low power region B2. Each inner high power region B1 merges smoothly into its respective outer low power region B2. Each aiming lens 44 has an optical power that increases along the horizontal X-axis in a direction toward the imaging axis 18.

As best shown in FIG. 7, the inner high power regions B1 collect and project a major portion of the aiming lights onto the aiming mark 60 at the center zone of the aiming light pattern, and the outer low power regions B2 collect and project a minor portion of the aiming lights onto the remaining area or peripheral zones of the aiming light pattern. Thus, the visibility of the aiming mark 60 has been enhanced by making the brightness of each aiming light line non-uniform. More particularly, the brightness of each aiming light line increases in the direction toward the imaging axis 18 due to the inner high power regions B1. The enhanced aiming mark 60 constitutes a more prominent visual indicator of the center zone of the field of view 20 in which the target 24 is positioned over the range of working distances.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading a target by image capture over a range of working distances away from the module, comprising:
   an imaging system including an imaging sensor for sensing light returning from the target along an imaging axis over a field of view that extends along mutually orthogonal, horizontal and vertical axes that are generally perpendicular to the imaging axis; and
   an aiming light system offset from the imaging system and operative for directing an aiming light pattern at the target, for optically forming the aiming light pattern with an aiming mark in a central area of the aiming light pattern and with a pair of aiming light lines that are collinear along the horizontal axis, and for optically enhancing the visibility of the aiming mark relative to a remaining area of the aiming light pattern by optically configuring the aiming light lines to be of non-uniform brightness, the aiming mark of enhanced visibility constituting a prominent visual indicator of a center zone of the field of view in which the target is positioned over the range of working distances.

2. The module of claim 1, wherein the aiming light system optically configures the aiming mark to be greater in brightness relative to the remaining area of the aiming light pattern.

3. The module of claim 1, wherein the aiming light system includes a pair of aiming light assemblies spaced apart along the horizontal axis at opposite sides of the imaging sensor, and wherein the light assemblies include a pair of aiming light sources for emitting a pair of aiming lights along a pair of aiming axes, a pair of aiming source apertures through which the aiming lights respectively pass along the aiming axes, and a pair of aiming lenses for respectively optically modifying the aiming lights to form the aiming light pattern.

4. The module of claim 3, wherein the aiming light sources are light emitting diodes, and wherein the aiming source apertures are elongated openings extending along the horizontal axis.

5. The module of claim 3, wherein each aiming lens has an entrance surface on which the aiming lights are incident, and an exit surface from which the aiming lights are projected onto the target, and wherein each exit surface is a continuous, freeform surface that is free of discontinuities.

6. The module of claim 3, wherein the aiming lenses are symmetrically located at opposite sides of the imaging axis; wherein each aiming lens has an inner high power region of greater optical power that is closer to the imaging axis, and an outer low power region of lesser optical power that is further from the imaging axis; wherein the inner high power regions project a major portion of the aiming lights onto the aiming mark; and wherein the outer low power regions project a minor portion of the aiming lights onto the remaining area of the aiming light pattern.

7. The module of claim 6, wherein the inner high power regions and the outer low power regions are curved and merge smoothly together, and wherein the inner high power regions have a greater curvature than the outer low power regions.

8. The module of claim 6, wherein each aiming lens has an optical power that increases along the horizontal axis toward the imaging axis, and wherein the brightness of each aiming light line increases along the horizontal axis toward the imaging axis.

9. The module of claim 3, wherein the aiming lenses are of one-piece construction.

10. The module of claim 3, and a light-transmissive window overlying the imaging sensor, and wherein the aiming lenses are of one-piece construction with the window.

11. An imaging reader for reading a target by image capture over a range of working distances away from the reader, comprising:
    a housing having a light-transmissive window; and
    an imaging module mounted in the housing, the module having
       an imaging system including an imaging sensor for sensing light returning from the target along an imaging axis through the window over a field of view that extends along mutually orthogonal, horizontal and vertical axes that are generally perpendicular to the imaging axis, and
       an aiming light system offset from the imaging system and operative for directing an aiming light pattern through the window at the target, for optically forming the aiming light pattern with an aiming mark in a central area of the aiming light pattern and with a pair of aiming light lines that are collinear along the horizontal axis, and for optically enhancing the visibility of the aiming mark relative to a remaining area of the aiming light pattern by optically configuring the aiming light lines to be of non-uniform brightness, the aiming mark of enhanced visibility constituting a prominent visual indicator of a center zone of the field of view in which the target is positioned over the range of working distances.

12. The reader of claim 11, wherein the aiming light system includes a pair of aiming light assemblies spaced apart along the horizontal axis at opposite sides of the imaging sensor, and wherein the light assemblies include a pair of aiming light sources for emitting a pair of aiming lights along a pair of aiming axes, a pair of aiming source apertures through which the aiming lights respectively pass along the aiming axes, and a pair of aiming lenses for respectively optically modifying the aiming lights to form the aiming light pattern; and wherein each aiming lens has an entrance surface on which the aiming lights are incident, and an exit surface from which the aiming lights are projected onto the target, and wherein each exit surface is a continuous, freeform surface that is free of discontinuities.

13. The reader of claim 12, wherein the aiming lenses are symmetrically located at opposite sides of the imaging axis; wherein each aiming lens has an inner high power region of greater optical power that is closer to the imaging axis, and an outer low power region of lesser optical power that is further from the imaging axis; wherein the inner high power regions project a major portion of the aiming lights onto the aiming mark; wherein the outer low power regions project a minor portion of the aiming lights onto the remaining area of the aiming light pattern; wherein each aiming lens has an optical power that increases along the horizontal axis toward the imaging axis; and wherein the brightness of each aiming light line increases along the horizontal axis toward the imaging axis.

14. A method of reading a target by image capture over a range of working distances away from an imaging reader, the method comprising:
    sensing light returning from the target along an imaging axis over a field of view that extends along mutually orthogonal, horizontal and vertical axes that are generally perpendicular to the imaging axis;
    directing an aiming light pattern at the target;
    optically forming the aiming light pattern with an aiming mark in a central area of the aiming light pattern and with a pair of aiming light lines that are collinear along the horizontal axis; and
    optically enhancing the visibility of the aiming mark relative to a remaining area of the aiming light pattern by optically configuring the aiming light lines to be of non-uniform brightness, the aiming mark of enhanced visibility constituting a prominent visual indicator of a center zone of the field of view in which the target is positioned over the range of working distances.

15. The method of claim 14, wherein the optical enhancing is performed by configuring the aiming mark to be greater in brightness relative to the remaining area of the aiming light pattern.

16. The method of claim 14, wherein the optical enhancing is performed by emitting a pair of aiming lights along a pair of aiming axes at opposite sides of the imaging axis, passing the aiming lights along the aiming axes through respective apertures, and optically modifying the aiming lights with a pair of aiming lenses.

17. The method of claim 16, and configuring each aiming lens with an entrance surface on which the aiming lights are incident, and with an exit surface from which the aiming lights are projected onto the target, and configuring each exit surface with a continuous, freeform surface that is free of discontinuities.

18. The method of claim 16, and configuring each aiming lens with an inner high power region of greater optical power that is closer to the imaging axis, and with an outer low power region of lesser optical power that is further from the imaging axis; projecting a major portion of the aiming lights by the inner high power regions onto the aiming mark; projecting a minor portion of the aiming lights by the outer low power regions onto the remaining area of the aiming light pattern; increasing the optical power of each aiming lens along the horizontal axis toward the imaging axis; and increasing the brightness of each aiming light line along the horizontal axis toward the imaging axis.

19. The method of claim 18, and curving and smoothly merging the inner high power regions and the outer low power regions together, and configuring the inner high power regions with a greater curvature than the outer low power regions.

20. The method of claim 16, and configuring the aiming lenses to be of one-piece construction.

* * * * *